Figure 3:
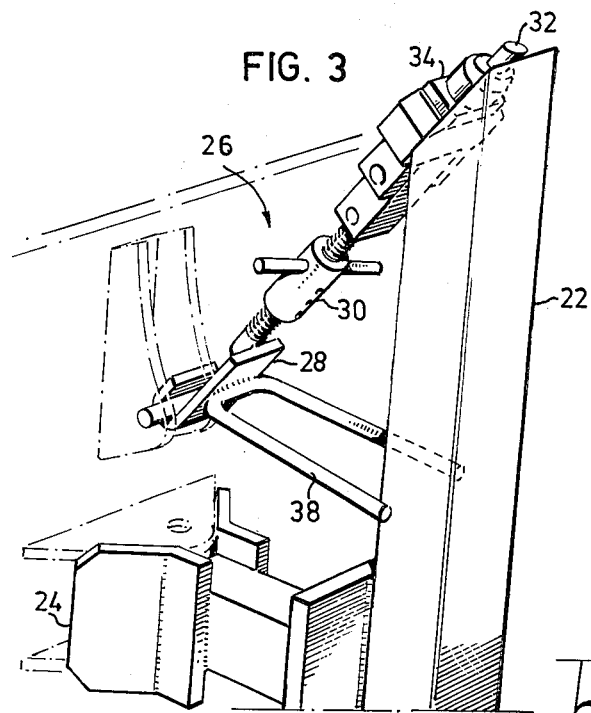

United States Patent [19]
Oksala et al.

[11] 3,923,296
[45] Dec. 2, 1975

[54] DEVICE FOR TILTING AUTOMOBILE BODIES ON AUTOMOBILE BODY ASSEMBLY LINES

[75] Inventors: Aake Fritiof Oksala, Alvangen; Bror Arne Vilhelm Hultberg; Sven Erik Svensson, both of Hisings Backa, all of Sweden

[73] Assignee: AB Volvo, Goteborg, Sweden

[22] Filed: Aug. 26, 1974

[21] Appl. No.: 500,731

[52] U.S. Cl. .................. 269/60; 214/1 A; 254/126
[51] Int. Cl.² .................... B23Q 3/18; B66F 3/08
[58] Field of Search .......... 214/1 A; 269/55, 56, 58, 269/59, 60, 61, 62; 254/126

[56] References Cited
UNITED STATES PATENTS

| | | | |
|---|---|---|---|
| 1,003,735 | 9/1911 | Hackney | 269/61 |
| 1,567,675 | 12/1925 | Pitt et al. | 269/60 |
| 2,622,746 | 12/1952 | Campling | 269/60 |
| 3,693,937 | 9/1972 | Yamazaki | 254/126 |

FOREIGN PATENTS OR APPLICATIONS

| | | | |
|---|---|---|---|
| 113,673 | 4/1969 | Denmark | 214/1 A |
| 975,010 | 10/1950 | France | 214/1 A |

*Primary Examiner*—Al Lawrence Smith
*Assistant Examiner*—James G. Smith
*Attorney, Agent, or Firm*—Young & Thompson

[57] ABSTRACT

Device for tilting automobile bodies during assembly, comprising an underframe movable along the assembly line, e.g. by means of a conveyor. The underframe carries a fastening frame having means to fasten the underside of an automobile body against the fastening frame. A tilting device is connected to the underframe and the fastening frame, by means of which device the fastening frame is tiltable in relation to the underframe.

5 Claims, 4 Drawing Figures

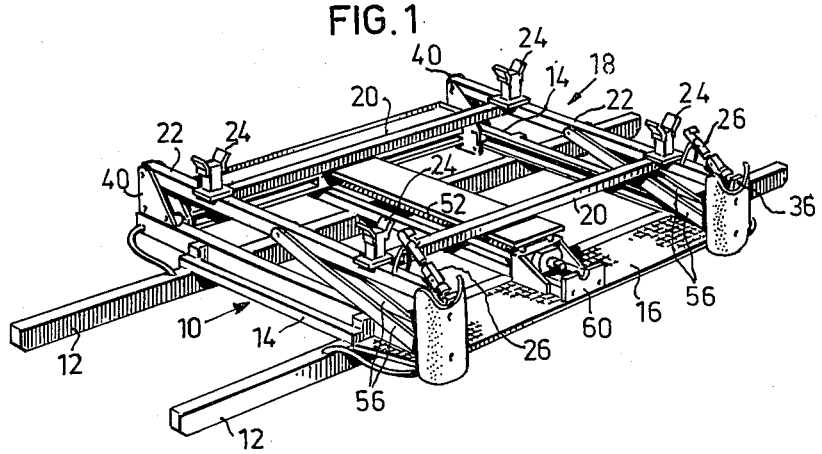
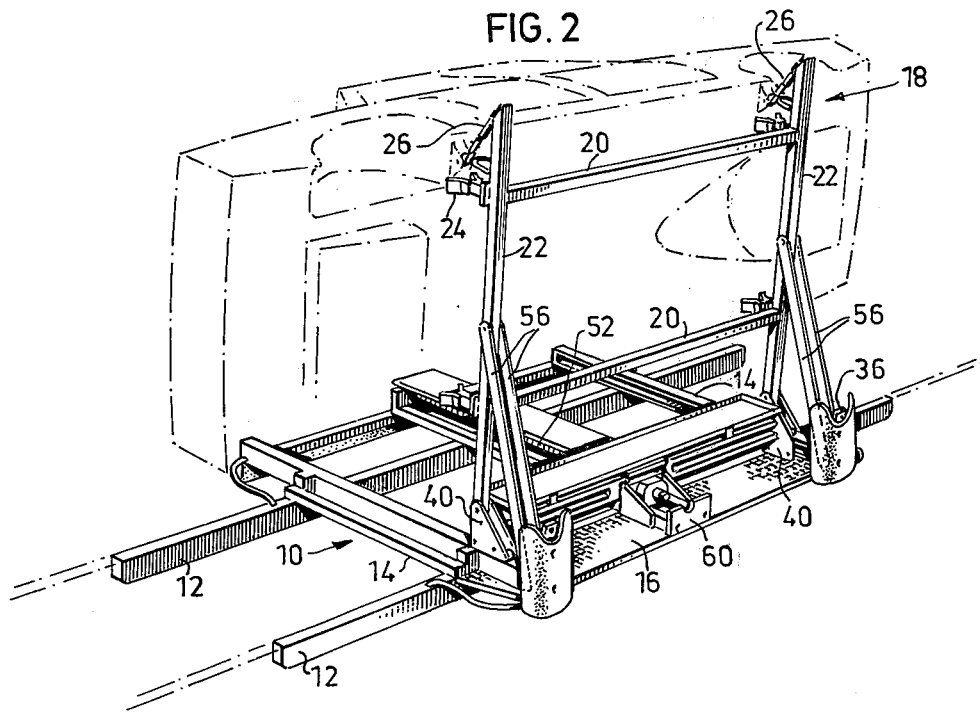

DEVICE FOR TILTING AUTOMOBILE BODIES ON AUTOMOBILE BODY ASSEMBLY LINES

The present invention relates to a device for tilting automobile bodies on automobile body assembly-lines.

In assembly-line production of automobile bodies it has, to date, been common to transport said bodies along an assembly-line which is situated in the floor plane when work is to be carried out on all sides of the body except for the underside. When work is to be carried out on the underside of the body, said body has been transported over pits in the workshop floor or the body has been transported suspended from a conveyor. Assembly is carried out from below and upwards. This "under-up" assembly is very demanding on the mechanics and, thus, it is desirable that such assembly be restricted as much as possible.

The purpose of the present invention is to obtain a device by means of which it is possible to eliminate the need for pits in the floor and essentially completely eliminate under-up assembly work in an assembly-line which is situated in the floor plane.

This is achieved according to the invention by means of a device which has an underframe intended to be advanced along the assembly-line, a fastening frame having arrangements for fastening the underside of the body against the fastening frame and a tilting device which is attached to the underframe and the fastening frame, by means of which tilting device the fastening frame can be tilted in relation to the underframe between a horizontal and a vertical position.

Figure 4:
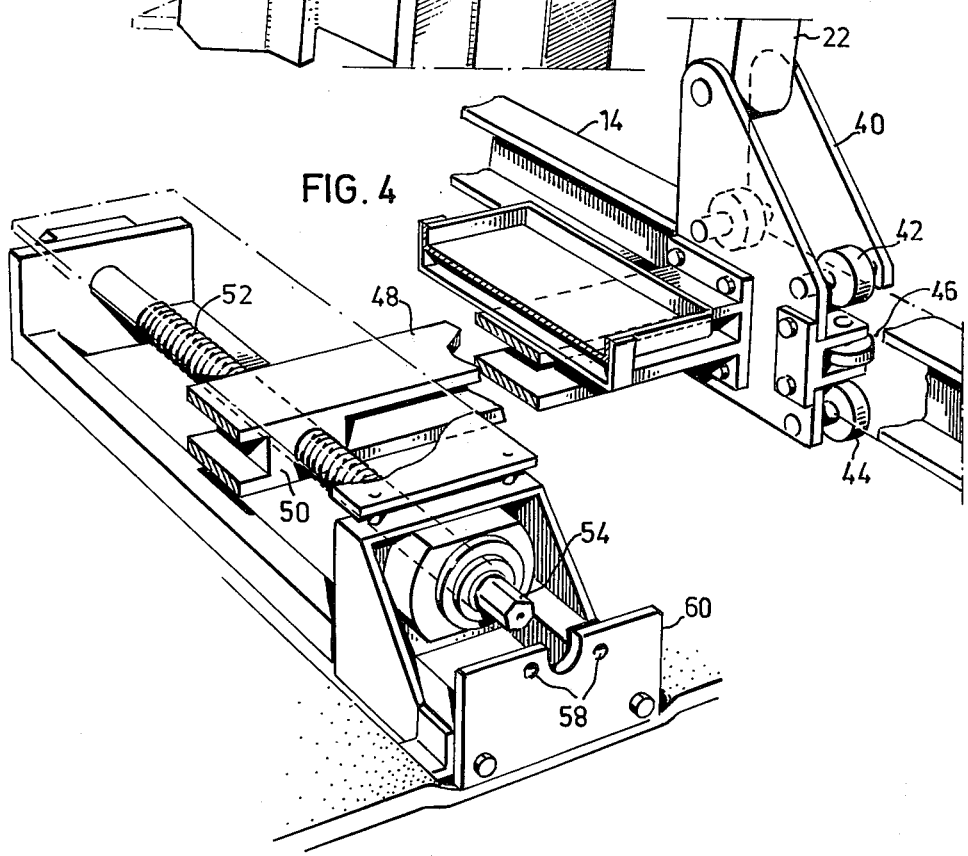

The invention is described in more detail below, with reference being made to an example shown in the enclosed drawings in which FIG. 1 is a perspective view of an embodiment of the device according to the invention in which the fastening frame is in the horizontal position, FIG. 2 shows the device in FIG. 1 when the fastening frame is in the vertical position, FIG. 3 is an enlarged-scale perspective view of a portion of the fastening frame and FIG. 4 is a partially sectioned perspective view on an enlarged scale of a mechanism for tilting the fastening frame.

The device shown in FIGS. 1 and 2 comprises an underframe which is generally identified by reference numeral 10, said underframe having two lateral beams 12 intended to be placed on the assembly-line and be advanced by its chain (not shown here). The beams 12 are mutually connected by two transverse beams 14 which, as is made clear by FIG. 4, are formed by U-beams which have been placed on their edges. An assembly platform 16 extends along one of the long sides between said U-beams.

The underframe 10 has a frame 18 which, as shall be described later, can be tilted, to which frame the body can be fastened as is shown in FIG. 2. The frame 18 has a pair of longitudinal beams 20 which are mutually connected by means of two transverse frame beams 22 which are placed directly above the transverse beams 14 of the underframe. The frame beams 22 have Y-shaped supporting means 24, against which the rear attachments for the wheel suspension of the body (see FIG. 3) and its forward longitudinal frame beams are intended to be supported. Furthermore, both of the frame beams 22 have a fastening means 26 at one of their outer ends. The fastening means 26 are intended to engage with the ordinary jack attachments of the body by means of a U-shaped bow 28, as shown in FIG. 3. The actual fastening is obtained by means of tightening a shroud screw 30, whereby an outwardly spring-loaded pin 32 is simultaneously drawn into a part 34 of the fastening means 26. The pins 32, when extended, engage in corresponding holes 36 (FIGS. 1 and 2) in the underframe 10 so that tilting of the frame 18 is prevented. A fork 28 which is welded to the bow 38 clasps transverse beam 22 in order to laterally fix the bow 38 in relation to the beam 22.

As can be most clearly seen in FIG. 4, the frame beams 22 of the fastening frame 18 are, at the end which is opposite the end in which fastening means 26 is arranged, journalled in trolleys 40 which can be moved along the transverse beams 14 of the underframe 10. The trolleys 40 are carried by two sets of wheels having three wheels 42, 44, 46 each, whereby one wheel 42 in each set rolls against the horizontal upper side of the beam 14, one wheel 44 rolls against the horizontal underside of said beam 14 and one wheel 46 rolls against the vertical inner side of said beam 14 so that each trolley is prevented from moving upwards, downwards and outwards. The trolleys 40 are mutually connected by means of a longitudinal beam 48 so that they are also prevented from moving inwards. The beam 48 has a nut element 50 which is formed as a unit with the same and situated in the middle of the beam. The nut element 50 engages with a buttress threaded screw 52 which extends in the transverse direction of the underframe 10, said screw 52 being rotatably journalled in the underframe 10. One end 54 of the screw 52 has a hexagonal cross section intended to engage with an outer motor. Such motors can be placed along the assembly-line at the stations where the body is to be tilted.

When the screw 52 is rotated, the beam 48, and therewith the trolleys 40, are moved in the transverse direction of the underframe. In order to achieve tilting of the fastening frame 18 between the positions shown in FIGS. 1 and 2, said tilting taking place during the above-mentioned movement of the beam 48, the two transverse beams 22 of the frame 18 are, approximately in their middle, connected to one end of a pair of joint arms 56, the opposite ends of which are connected to the end of the transverse beams 14 which are facing the assembly platform 16.

Bascially, only a key is needed to rotate the screw 52, but a motor is preferably used in order to obtain a speedy rearrangement of the fastening frame. The motor can be of any type, electric, pneumatic or hydraulic. Similarly, the motor can be movable or stationarily arranged next to the assembly-line. If a movable motor is used, a pair of bores 58 in a flange 60 which is arranged in front of the screw can be used, into which bores corresonding pins on the motor casing are inserted so as to serve as a locking means so that the casing of the motor is not turned instead of its shaft. The use of a movable motor carries with it the advantage that tilting can be carried out during continuous advancement of the bodies on the assembly-line.

What we claim is:

1. Device for tilting a motor vehicle body during assembly along an assembly line, comprising an underframe, a fastening frame supported by the underframe and having means for fastening the underside of the body to said fastening frame and tilting means connected to the underframe and the fastening frame for tilting the fastening frame relative to the underframe between a horizontal and vertical position, said tilting means comprising at least two trolleys which are movable horizontally in a transverse direction on the underframe by means of a horizontal driving arrangement, joint arms pivotably connected at one end to the underframe, the fastening frame being pivotably connected to the trolleys and to the other end of said joint arms, whereby when the trolleys are moved on the underframe, the fastening frame is tilted between a horizontal and vertical position.

2. Device according to claim 1, wherein the horizontal driving arrangement comprises a horizontal transverse screw which is rotatably arranged on the underframe, said screw having a nut element which is rigidly connected to the trolleys so as to move the same when the screw is rotated.

3. Device according to claim 2, wherein the screw has means for drivable connection to a separate motor.

4. Device according to claim 1, wherein the underframe has at least two transverse U-beams positioned on one of their edges and each trolley has at least three wheels, one of which runs along the horizontal upper side of one of said beams, one of which runs along the horizontal underside of said beam, and one of which runs along the vertical inner side of said beam.

5. Device according to claim 3, wherein means are provided for connection of the casing of a said separate motor with the underframe.

* * * * *